Patented June 17, 1941

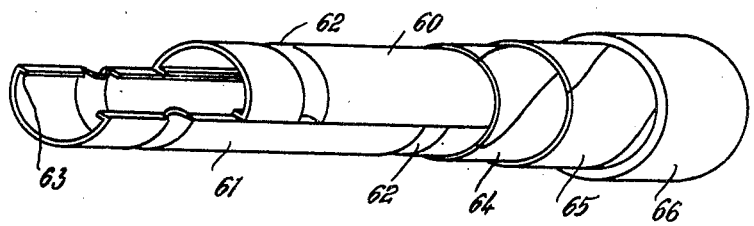
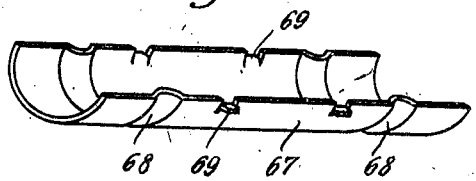
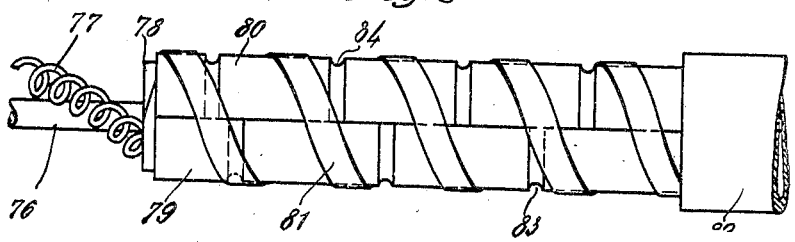

2,245,766

UNITED STATES PATENT OFFICE 2,245,766

SELF-SUPPORTING HOLLOW CONDUCTOR FOR ELECTRIC CABLES

Werner Dörfel, Berlin-Siemensstadt, Ernst Fischer, Berlin-Lichterfelde, and Hermann Lintzel, Berlin-Siemensstadt, Germany, assignors to Siemens & Halske, Aktiengesellschaft, Siemensstadt, near Berlin, Germany, a corporation of Germany Application September 23, 1937, Serial No. 165,280
In Germany September 26, 1936

8 Claims. (Cl. 174—29)

Our invention relates to self-supporting hollow conductors for electric cables, particularly for high-frequency cables, the hollow conductors being provided at short intervals with grooves.

In cable engineering hollow conductors are often necessary which in themselves represent a self-supporting conductor, but must be nevertheless flexible. For instance, such hollow conductors may be employed as high-voltage overhead lines, as hollow conductors for high-voltage cables, as inner and outer conductors for concentric high-frequency cables and as protective screens for twisted high-frequency cables. It has hitherto been customary to manufacture such hollow conductors of a stranded layer of sectional bands or wires engaging in or overlapping one another. Such hollow conductors are not only comparatively expensive to manufacture, since the bands must have a certain minimum thickness, but present also other drawbacks. For instance, in the case of concentric high-frequency cables, an outer conductor consisting of stranded sectional bands gives rise to magnetic longitudinal fields.

Furthermore, it is known in the manufacture of high-frequency cables to make the outer conductor of a band bent into a tube which is provided throughout the whole length or at short intervals with grooves. According to this known method the edges overlap one another or they are welded or soldered together. In the first case a self-supporting hollow cylinder is, however, not obtained, apart from the fact that the overlapping seam increases the diameter of the hollow conductor. A welding or soldering of the edges is expensive and it can hardly be performed, if heat-sensitive insulating materials are arranged inside the hollow conductor.

The invention relates to an advantageous design of such supporting hollow conductors which are provided at short intervals with grooves and which consist either of a single band bent into a tube or of a plurality of bands of arcuate cross-section. According to the invention such hollow conductors are so designed that the edges of the band or the bands abut against each other and are prevented from slipping over each other only by suitably shaping the same without the need of welding or soldering them with one another. In order to firmly press the edges against one another, the hollow conductor is surrounded with additional fastening members; for instance, ribbons, threads or wires are wound around the hollow conductor in open or closed helical turns.

A hollow conductor thus constructed presents numerous advantages, since it is far more flexible and has a great compressive strength, even when employing comparatively thin bands. Furthermore, the hollow conductor is economical and easy to manufacture. A further advantage consists in the fact that the band or the bands extend in the longitudinal direction and the currents in the hollow conductor flow therefore in the longitudinal direction as well. When using the hollow conductor as an inner or outer conductor for concentric high-voltage cables no interfering magnetic longitudinal field can therefore occur.

The invention may be carried into practice in different ways. For instance, the edge portions of the bands lying between the grooves serving to increase the flexibility may be provided with additional notches which are displaced with respect to one another in the longitudinal direction.

A particularly advantageous form of the invention consists in preventing the slipping over of the edges by means of the grooves themselves. This may be accomplished by the use of a single band bent into the shape of a tube; for instance, by the fact that the single grooves run obliquely in such a manner that the ends of each groove are displaced with respect to one another after bending the band into a tube. When manufacturing the hollow conductor of two bands bent into half shells, the two bands may be so displaced with respect to each other as to result in a mutual displacement of the grooves of the two bands in the longitudinal direction.

In the accompanying drawings are shown various forms of the invention in diagrammatic form—

Figs. 6 and 7 exemplify two other modifications, and

Fig. 8 represents a high-frequency cable also constructed according to the invention.

Figure 1:
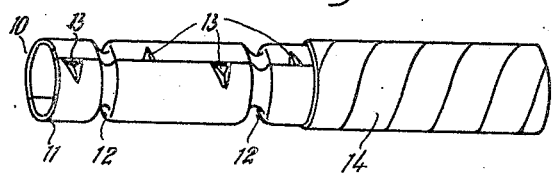
Fig. 1 shows a section of a hollow conductor according to the invention in a perspective view.

According to Fig. 1 the hollow conductor is formed of two bands 10 and 11 bent into semicircular shape, the bands being provided at short intervals with grooves 12 in order to increase the flexibility thereof. To prevent the two half shells—even in the case of relatively thin bands— from slipping over each other owing to a slight diametrical displacement, the same are provided according to the invention with inwardly pressed-in notches 13 located in the band portions lying between the grooves 12. The two shells are surrounded by a closed band winding 14 consisting of a pull-resistant and, if desired, good conducting material, in order to firmly hold both bands 10 and 11 together.

Figure 2:
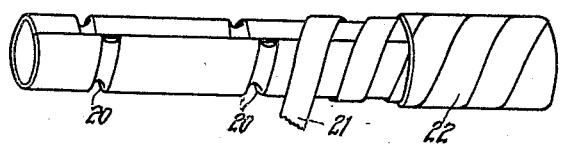
Figs. 2 and 3 illustrate two other embodiments also in perspective.

Fig. 2 shows an embodiment in which the hollow conductor is formed of a single band bent into tubular shape. To prevent an overlapping or slipping over of the edges in this embodiment the grooves 20 run somewhat obliquely so that both ends of each groove after bending the band into tubular form are displaced with respect to each other as will be seen from Fig. 2. The hollow conductor thus formed is wound around with the pull-resistant band 21 in open helical turns which preferably consists of the same metal as the hollow conductor, for instance of copper, and is then surrounded with a closed band winding 22.

Figure 3:
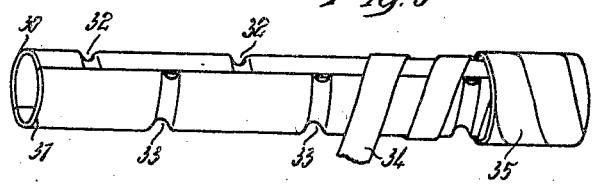

According to Fig. 3 the hollow conductor is formed of two bands 30 and 31 bent into semi-circular shape, the bands being provided at short intervals with grooves 32 and 33. As will be seen from Fig. 3 the grooves 32 are displaced with respect to the grooves 33, so that the edges are supported by the grooves even in the case of a diametrical displacement of the bands. Both conductors 30 and 31 are held firmly together in the same manner as shown in Fig. 2 by the pull-resistant open band winding 34 and the protective closed band winding 35.

Figure 4:
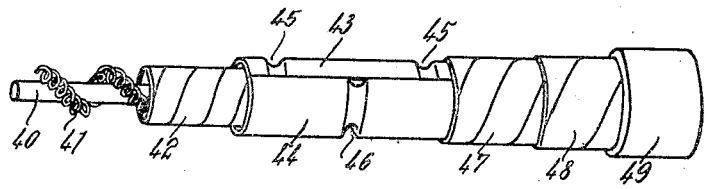
Figs. 4 and 5 represent two concentric high-frequency cables designed in accordance with the invention.

In Fig. 4 is shown a concentric high-frequency cable manufactured according to the invention. The inner conductor 40 is first wound around with the spacing element 41 in open helical turns and is then surrounded with a closed band winding 42 of insulating material. The spacing element 41 has as is well known the form of an open thread helix and consists of resistant insulating material, for instance polystyrene which is especially advantageous for high frequency purposes. As an outer conductor a hollow conductor designed according to Fig. 3 is employed. In Fig. 4, 43 and 44 denote the two bands bent into semi-circular shape which are provided at short intervals with the grooves 45 and 46. These grooves 45 and 46 serve at the same time for producing an air space insulation, since they are pressed inwardly, thereby maintaining an air space in a way which reduces to a considerable extent the amount of insulating material necessary for securing the air space insulation. A further reduction of the insulating material may be obtained by the fact that the insulators 41 and 42 may be carried out relatively thin owing to the self-supporting properties of the outer conductor on account of which the air space insulation serves only to center the conductor 40, but not to support the outer conductor bands. The two outer conductor bands 43 and 44 are firmly held together by the closed band winding 47 which consists preferably of good conducting material, for instance of copper, in order to screen the interstices, if any, electrostatically and under certain circumstances electromagnetically. 48 is a closed band winding of insulating material, for instance a winding of a lacquered linen band. The whole is surrounded with a water-proof metal sheath 49. Since the outer conductor designed according to the invention does not produce any magnetic longitudinal fields and since no additional attenuation of magnetical longitudinal fields is necessary the cable sheath 49 may consist of a non-hygroscopial insulating material.

Figure 5:
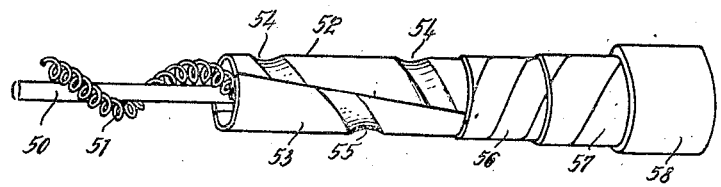

Fig. 5 shows another form of a concentric high-frequency cable with a spacing element wound around the inner conductor in open helical turns. 50 denotes the inner conductor around which is wound a thread helix 51 of resistant insulating material as a spacing element. The outer conductor consists of two bands 52 and 53 which are provided at short intervals with grooves 54 and 55. In order to increase the flexibility of the bands the grooves are provided with a plurality of longitudinal slots uniformly distributed over the periphery. According to the invention the spacing element 51 is so arranged with respect to the two bands 52 and 53 that the spacing element runs between the successive grooves through the plane of the abutting edges and therefore contacts throughout its whole length with the inner surface of the hollow conductor. In this case the length of twist of the spacing element is chosen similar to the distance between successive grooves of the bands. It is, however, to be noted that the distances between the grooves 55 are smaller than those between the grooves 54 so that the two distances are non-multiples of each other. In the embodiment shown in Fig. 5 it is of advantage that the grooves 54 and 55 run somewhat obliquely and in the same direction as the spacing element. The outer sheath is as shown in Fig. 5 formed of the band winding 56 and 57 and of the waterproof cable sheath 58.

A further advantage of the invention is presented in that the hollow conductor is sufficiently flexible, even if the abutting edges extend in parallel relation to the axis of the hollow conductors; i. e., without twist. In particular cases, as shown in Fig. 5, a very long twist may, however, be given to the band or bands without having to put up with great disadvantages. Further, it is also possible according to the invention to make the hollow conductor of three or four correspondingly shaped bands instead of one or two bands.

According to the invention the edges of the bands may also be prevented in a simple manner from slipping over each other by bending the edges outwardly or inwardly throughout the whole length or at certain points in the radial direction so as to create radially extending lugs and therefore larger supporting surfaces. The edges are preferably bent only in the portions of the bands lying between the grooves into rims or lugs.

In this manner, the edges of the bands are prevented from slipping over each other to a greater extent, which is of particular importance, if relatively thin bands are employed. The bands provided with radial rims or lugs may be produced with the aid of simple means, so that no disadvantages are presented in this respect.

According to Fig. 6 the hollow conductor manufactured according to the invention is composed of two half shell-shaped bands 60 and 61 which are provided at short intervals with grooves 62. To prevent the edges of the bands from slipping over each other, the edges of the bands are bent inwardly in the radial direction so as to create radial rims 63. These rims extend in the embodiment shown only along the portion of the bands lying between the grooves so that the flexibility of the bands it not impaired by these rims. These rims may also be provided in the grooves; it being, however, preferable to increase the flexibility thereof by special measures. For instance, the radial rims in the groove portion may be provided with one or more notches. In order to firmly hold the bands 60 and 61 together the hollow conductor is surrounded with the band winding 64 consisting of a pull-resistant material, for instance, of copper. A further band winding 65, for instance of insulating material, and a waterproof cable sheath 66 are then applied thereto. A single air space insulated conductor or also an air space insulated twisted conductor group may be arranged in the interior of the hollow conductor. In the first case the hollow conductor serves as a return conductor and in the last case as a screen.

Fig. 7 shows a form of the invention in which the edges of a band bent into semi-circular shape are bent in the radial direction only at some points so as to form radially extending lugs on which the straight edges of the other band may be supported. Fig. 7 shows a perspective view of a short piece of a half-shell shaped band. The band is denoted by the numeral 67 and the grooves by the numeral 68. The edges are bent at two points between the grooves 68 into a lug 69 which forms a supporting surface for the overlapping edges of the other band.

If the hollow conductor consists of a plurality of bands of arcuate cross-section provided with grooves, it may be of advantage to arrange the grooves or the notches of the single bands in such a manner that the distance between the grooves is different. It is preferable to choose a ratio of the distance between two grooves of one band to the distance between two grooves of the other band smaller than 2:1, since in this manner between every two grooves of one band always lies a groove of the other band.

Since always a certain lengthening of the band is caused by the grooves, the ratio of the distances between the grooves of the single bands is to be chosen as small as possible in order to keep the differences between the resistances of the bands as small as possible. The distance between the grooves of the single bands is preferably made only somewhat greater than the possible displacement of the bands during the manufacturing process.

Owing to the peculiarity of the usual methods for manufacturing the grooves, according to which the bands are bent and the grooves are pressed in by press tools, projections, which extend somewhat beyond the plane passing through the band edges, occur within the range of the grooves. At the points where the grooves of the single bands are in registry, an increase of the diameter of the hollow conductor would then be caused by the projections engaging each other. It is therefore preferable to choose a method for the production of grooves according to which such projections cannot occur, or to remove the projections before assembling the bands to a hollow conductor.

Fig. 8 shows a form of a hollow conductor as an outer conductor for a concentric high-frequency cable made according to the last-mentioned method. In this case the spacing element 77 is wound around the inner conductor 76 in open turns and the whole is surrounded with the closed insulating sheath 78. The two bands 79 and 80 of a semi-circular cross-section—which are held together by the ribbon 81 and are surrounded by a watertight sheath 82—are provided at intervals with semi-circular grooves 83 and 84 respectively. The distance between the grooves 83 is somewhat greater than the distance between the grooves 84, the ratio between the distances being, however, smaller than 2:1. In this manner even if a groove 83 is in registry with a groove 84, the next following grooves are, however, displaced with respect to each other.

We claim as our invention:

1. A hollow conductor consisting of a band structure forming a tube and having its abutting edges movable relative to each other, said band structure having transverse grooves, said grooves having their ends abutting against a straight portion of the adjacent edge of said band structure so as to prevent the abutting edges from slipping over each other.

2. A flexible hollow conductor consisting of a band structure forming a tube and having its abutting edges movable relative to each other, said band structure having transverse grooves, said grooves having their ends abutting against a straight portion of the adjacent edge of said band structure so as to prevent the abutting edges from slipping over each other, and fastening strand means wound around said band structure for holding said abutting edges together.

3. A flexible hollow conductor comprising a tubular band structure having its abutting edges formed mainly of straight portions movable relative to each other, said band structure having inwardly projecting grooves extending in transversal direction between the longitudinal edges of said band structure and being arranged to have their ends abutting against a straight portion of the adjacent edge, and strand means wound around said band structure for holding the abutting edges of said structure together.

4. A flexible hollow conductor comprising a tube composed of a plurality of bands of arcuate cross section having their abutting edges formed mainly of straight portions movable relative to each other, said bands having inwardly bulging transversal grooves, the grooves of adjacent bands being displaced with respect to each other in the longitudinal direction of said tube so that the ends of said grooves abut against a straight portion of the edge of the adjacent band, the portions of said edges lying between said grooves forming radial projections, and pull-resistant strand means wound helically around said bands to hold said bands together while permitting them to exert bending movements.

5. A flexible hollow conductor comprising a tube composed of a plurality of bands of arcuate cross section having their abutting edges movable relative to each other, said bands having inwardly bulging transversal grooves arranged at short intervals, the distances between the grooves of a band being different from the distances between the grooves of an adjacent band, the portions of the edges of each of said bands lying between the grooves of said band abutting against the ends of the grooves in the adjacent band so as to prevent the abutting edges of said bands from slipping over each other, and pull-resistant strand means wound helically around said bands to hold said bands together while permitting them to exert bending movements.

6. A flexible hollow conductor comprising a tube composed of a plurality of bands of arcuate cross section having their abutting edges movable relative to each other, said bands having inwardly bulging transversal grooves arranged at short intervals, the distances between the grooves of a band being a non-multiple of the distances between the grooves of an adjacent band, the portions of the edges of each of said bands lying between the grooves of said band abutting against the ends of the grooves in the adjacent band so as to prevent the abutting edges of said bands from slipping over each other, and pull-resistant strand means wound helically around said bands to hold said bands together while permitting them to exert bending movements.

7. In a concentric high-frequency cable, a central conductor, a hollow outer conductor consisting of a band structure having its abutting edges movable relative to each other, said band structure having inwardly projecting transversal grooves, said grooves being displaced at the abutting edges of said outer conductor with respect to one another, spacing elements arranged around the inner conductor in helical turns passing between said displaced grooves, and strand means wound helically around said outer conductor.

8. In a concentric high-frequency cable, a central conductor, a hollow outer conductor consisting of a plurality of bands arranged with a long twist and having its abutting edges movable relative to each other, said band structure having inwardly projecting transversal grooves, said grooves being displaced at the abutting edges of said outer conductor with respect to one another and running obliquely with respect to said edges, spacing elements arranged around the inner conductor in turns running obliquely in the same direction as said grooves, and strand means wound helically around said open seam tube.

WERNER DÖRFEL.
ERNST FISCHER.
HERMANN LINTZEL.